Feb. 26, 1929.
A. D. BRIXEY
1,703,568
FRAMING DEVICE
Original Filed Oct. 11, 1919
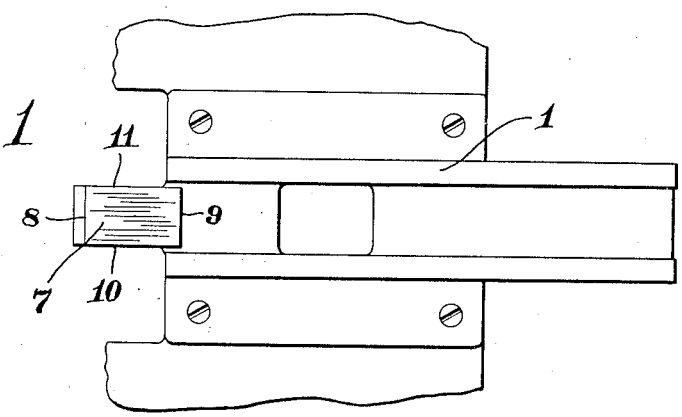
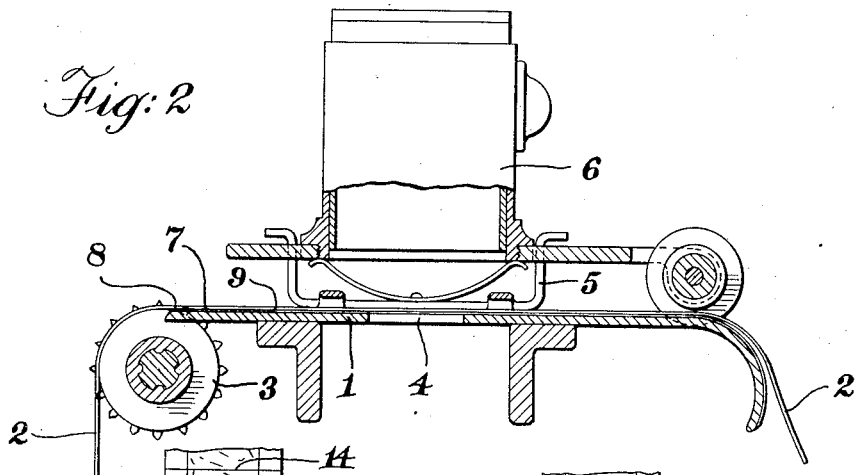
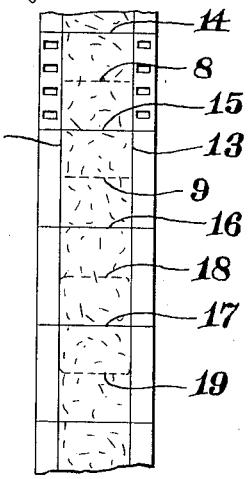
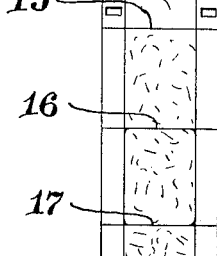
Inventor
A. D. Brixey
By his Attorney
Thomas Howe Patented Feb. 26, 1929.

1,703,568

UNITED STATES PATENT OFFICE.

AUSTIN DAY BRIXEY, OF GREENWICH, CONNECTICUT, ASSIGNOR TO THE REPLITURA CORPORATION, A CORPORATION OF NEW YORK.

FRAMING DEVICE.

Application filed October 11, 1919, Serial No. 330,096. Renewed December 29, 1925.

This invention relates to means for causing the pictures of moving picture films to be properly related to the projector window so that the picture will be framed on the screen.

Various devices are employed for shifting the adjustment of the film in the apparatus so as to secure proper positioning of the picture upon the screen, but such devices operate by observing the screen and operating the framing device until the picture on the screen has been shifted within the proper limits. It is a disagreeable thing, however, for the audience to observe the picture thus shifted around the screen.

It is a better plan to provide means for properly associating the film with relation to the projector window. It is of advantage, however, in effecting such an adjustment to have the reference point, with relation to which the reference point on the film is to be adjusted, located in the path of the film so that the film will pass over it in its passage through the apparatus. Accurate adjustment can then be obtained by bringing the two marks into proper relationship and the eye of the observer is greatly aided in this by the arrangement as indicated. Furthermore the observation of the relative adjustment of the reference marks may be more readily and accurately effected if the marks are of considerable area so that the operator can observe if proper relationship exists at a number of edges of the area. The pictures upon the film form different areas which are in a definite relationship to each other and consequently a practically advantageous embodiment of the invention exists where a square of white paper or the like, of the same size as a picture on the film, is placed along the film path so that in passing through the projecting apparatus the film passes over the white square. The square is placed in a predetermined relation to the projector window so that when a picture on the film is caused to register with the white square the film pictures will be so related to the window that the pictures will be properly framed. Accordingly it may be said that One object of the invention is to provide a reference point in predetermined relationship to the projector window, and with relation to which a point on the film bearing a predetermined relationship to the pictures is to be adjusted, which point is located in the path of the film over which the film passes in its passage through the projector apparatus.

A further object of the invention is to provide means for adjusting the film with relation to the projector window comprising an area located in predetermined relationship to the projector window and with which an area on the film in predetermined relationship to the pictures is adapted to be adjusted.

A further object of the invention is to provide an area conforming to that of a picture upon the film and located in predetermined relationship to the projector window so that by bringing the area and a picture into registry, proper framing of the picture is produced.

Other and ancillary objects of the invention will appear hereinafter.

In the accompanying drawings which illustrate the invention—

Fig. 1 is a top plan view, with the lenses and gate removed, of a projector;

Fig. 2 is a side elevation of the part of the projector shown in Fig. 1 with the lens tube and gate in position, the parts being partially in section;

Fig. 3 is a top plan view of the film showing the film as being out of registry with the square upon the machine and with which the pictures should register to secure proper framing; and Fig. 4 is a similar view but showing a film picture in registry with the white square.

Referring to the drawings a plate 1 over which the film 2 is drawn by means of the jump feed sprocket 3 has formed in it the window 4 for the light from the projector, 5 being a suitable tension device and 6 the usual projecting tube for the lens. Upon the front of the machine and located in the path of the film so that the film passes over it in its passage through the apparatus, is a plate or area 7, preferably of white color so that it may be easily observed. This area is placed at a predetermined distance from the window 4 and is of the same size and shape as each of the pictures upon the film. The forward and rearward edges of the area 7 are at 8 and 9 respectively, while the lateral edges of the area are at 10 and 11. The lateral edges of the pictures upon the film are coincident with the lines 12 and 13 while the successive pictures on the film are divided by the lines 14, 15, 16, 17 etc., each of these lines forming the rear edge of one picture and the forward edge of the succeeding picture.

Referring particularly to Fig. 3, the edges 10 and 11 of the area 7 upon a machine are directly beneath the lines 12 and 13 which constitute the edges of the pictures. The area 7 being white is readily observable through the more or less transparent film and it can be seen whether or not this area is in registry with the picture. In the position as shown in Fig. 3 it will be seen that the forward and rear edges 8 and 9 of the area 7 are not in registry with any of the lines 14, 15, 16 and 17 and also the window of which the forward and rear edges are indicated at 18 and 19 respectively, is not in registry with a picture. If, now, the film be adjusted forward or back in the apparatus so that the edge 8 comes into registry with the line 15 or 14 on the film, then, by reason of the predetermined location of the area 7 with relation to the window, the forward edge 18 of the window will be in registry with one or the other of the picture edges 17 or 16. The area 7 will then be in registry with the picture betwteen the lines 15 and 14 or the one immediately preceding it, while the window will also be in registry with the picture between the lines 16 and 17 or the one immediately preceding it on the film. In each case the registry of a picture with the area 7 will be accompanied by the registry of a picture with the window. This condition is illustrated in Fig. 4 when the lines 8, 9, 18 and 19 will be directly beneath the lines 14, 15, 16, 17 etc., marking the forward and rear edges of the pictures and being coincident therewith but not visible in the plan view of Fig. 4. These coincident positions of the forward and rear edges of the pictures, window and area 7 having been accomplished, the film is adjusted to its driving and holding apparatus in this relation and the operation of the apparatus may be proceeded with.

While the invention has been illustrated in what is considered its best application, it may have other embodiments, without departing from its spirit and is not limited to the structure shown in the drawings nor to the precise details of the method as recited.

What I claim is:

1. The combination with a moving picture apparatus having an area thereon located in predetermined relationship to but removed from the window of the projector of a moving picture film having an area thereon in predetermined relationship to the pictures whereby the pictures may be framed by bringing said areas into the predetermined definite relationship.

2. The combination with a moving picture apparatus having an area thereon located in predetermined relationship to but removed from the window of the projector, of a moving picture film having an area thereon in predetermined relationship to the pictures whereby the pictures may be framed by bringing said areas into registration.

3. The combination with a moving picture apparatus having an area located in predetermined definite relationship to but removed from the window of the projector, the size and form of said area being the same as that of a picture upon a film to be used therewith, of a moving picture film passing over said area in its passage through the apparatus whereby the pictures may be framed by bringing a picture and said area into registration.

In testimony whereof I have signed this specification this 5th day of August, 1919.

AUSTIN DAY BRIXEY.